United States Patent
Zhang et al.

(10) Patent No.: US 11,198,354 B2
(45) Date of Patent: Dec. 14, 2021

(54) HYBRID POWER SYSTEM HAVING CVT

(71) Applicant: Schaeffler Technologies AG & Co. KG, Herzogenaurach (DE)

(72) Inventors: Hongxi Zhang, Shanghai (CN); Chenfei Dong, Shanghai (CN); Yingjie Chen, Jiangsu (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/623,737

(22) PCT Filed: Jun. 11, 2018

(86) PCT No.: PCT/CN2018/090672
§ 371 (c)(1),
(2) Date: Dec. 17, 2019

(87) PCT Pub. No.: WO2018/233507
PCT Pub. Date: Dec. 27, 2018

(65) Prior Publication Data
US 2020/0122562 A1    Apr. 23, 2020

(30) Foreign Application Priority Data
Jun. 20, 2017 (CN) .......................... 201710470132.4

(51) Int. Cl.
*B60K 6/543* (2007.10)
*B60K 6/36* (2007.10)
(Continued)

(52) U.S. Cl.
CPC .................. *B60K 6/36* (2013.01); *B60K 6/26* (2013.01); *B60K 6/442* (2013.01); *B60K 6/543* (2013.01); *B60K 2006/268* (2013.01)

(58) Field of Classification Search
CPC ........ B60K 17/02; B60K 17/08; B60K 17/12; B60W 10/107
See application file for complete search history.

(56) References Cited

U.S. PATENT DOCUMENTS 6,306,057 B1 * 10/2001 Morisawa .............. B60K 6/383
475/5
6,459,978 B2 * 10/2002 Taniguchi ........... B60W 10/107
474/11
(Continued)

FOREIGN PATENT DOCUMENTS

CN        2848617 Y    12/2006
CN     101495338 A     7/2009
(Continued)

*Primary Examiner* — Jeffrey J Restifo (57) ABSTRACT

A hybrid power system includes a CVT, an internal combustion engine, an electric motor, a clutch, and a synchronization apparatus. The CVT has a CVT input shaft and a CVT output shaft. The internal combustion engine has an internal combustion engine output shaft and the electric motor has an electric motor shaft. The clutch is provided between the internal combustion engine and the CVT. The synchronization apparatus is provided between the internal combustion engine and the electric motor. The clutch and the synchronization apparatus can be adjusted to connect the internal combustion engine output shaft to the electric motor shaft via the CVT, and connect the internal combustion engine output shaft to the electric motor shaft without the CVT. In an example embodiment, the synchronization apparatus includes a first synchronizer between the internal combustion engine and the CVT, and a second synchronizer between the CVT and the electric motor.

13 Claims, 6 Drawing Sheets

(51) Int. Cl.
  *B60K 6/26* (2007.10)
  *B60K 6/442* (2007.10)

(56) References Cited

U.S. PATENT DOCUMENTS

| | | | | |
|---|---|---|---|---|
| 7,246,672 B2* | 7/2007 | Shirai | B60W 10/06 |
| | | | 180/65.25 |
| 7,740,093 B2* | 6/2010 | Abe | B60L 50/00 |
| | | | 180/65.6 |
| 7,788,010 B2* | 8/2010 | Kondo | B60W 30/18009 |
| | | | 701/61 |
| 7,819,212 B2* | 10/2010 | Kawasaki | B60W 10/00 |
| | | | 180/65.265 |
| 8,033,939 B2* | 10/2011 | Tabata | B60K 6/365 |
| | | | 475/5 |
| 8,147,366 B2* | 4/2012 | Kawasaki | B60K 6/543 |
| | | | 475/5 |
| 8,246,510 B2* | 8/2012 | Michishita | B60W 10/026 |
| | | | 477/8 |
| 8,512,202 B2* | 8/2013 | Oota | B60W 10/02 |
| | | | 477/5 |
| 9,150,213 B2* | 10/2015 | Ishikawa | B60W 10/06 |
| 9,573,456 B2* | 2/2017 | Lee | F16H 3/006 |
| 9,616,739 B2* | 4/2017 | Hwang | B60K 6/36 |
| 9,821,806 B2* | 11/2017 | Shimazu | B60W 10/06 |
| 10,081,240 B2* | 9/2018 | Lee | F16H 37/065 |
| 10,272,764 B2* | 4/2019 | Lee | F16H 3/085 |
| 10,272,765 B1* | 4/2019 | Cho | B60K 6/365 |
| 10,343,691 B2* | 7/2019 | Prost | B60W 20/40 |
| 10,434,862 B2* | 10/2019 | Hwang | B60K 6/365 |
| 10,451,152 B2* | 10/2019 | Hwang | F16H 37/0833 |
| 10,502,270 B2* | 12/2019 | Yoshida | F16D 23/06 |
| 10,538,155 B2* | 1/2020 | Hwang | B60K 6/547 |
| 10,591,056 B2* | 3/2020 | Washio | F16H 61/702 |
| 10,626,969 B2* | 4/2020 | Beck | F16H 3/66 |
| 10,641,371 B2* | 5/2020 | Cho | F16H 37/022 |
| 10,641,373 B2* | 5/2020 | Beck | F16H 3/66 |
| 10,655,718 B2* | 5/2020 | Hwang | F16H 37/0846 |
| 10,683,001 B2* | 6/2020 | Washio | F16H 61/66 |
| 10,704,662 B2* | 7/2020 | Beck | B60K 6/543 |
| 10,718,415 B2* | 7/2020 | Park | B60K 6/387 |
| 10,738,883 B2* | 8/2020 | Suzumura | F16H 37/0846 |
| 10,759,435 B2* | 9/2020 | Terada | F16H 37/0846 |
| 10,935,088 B2* | 3/2021 | Morino | B60W 30/18072 |
| 2004/0124021 A1* | 7/2004 | Shirai | B60K 6/387 |
| | | | 180/65.25 |
| 2016/0102742 A1* | 4/2016 | Lee | B60K 6/48 |
| | | | 475/5 |
| 2018/0148065 A1* | 5/2018 | Jacoby | B60K 6/547 |

FOREIGN PATENT DOCUMENTS

| | | |
|---|---|---|
| CN | 102910066 A | 2/2013 |
| CN | 103640464 A | 3/2014 |
| CN | 105916717 A | 8/2016 |
| CN | 106143105 A | 11/2016 |
| JP | 2009036231 A | 2/2009 |

* cited by examiner

HYBRID POWER SYSTEM HAVING CVT

CROSS-REFERENCE TO RELATED APPLICATIONS

This application is the United States National Phase of PCT Appln. No. PCT/CN2018/090672 filed Jun. 11, 2018, which claims priority to Chinese Application No. 201710470132.4 filed Jun. 20, 2017, the entire disclosures of which are incorporated by reference herein.

TECHNICAL FIELD

The present disclosure relates to a hybrid power system having a CVT, wherein the hybrid power system also has an internal combustion engine, an electric motor, and a clutch provided between the internal combustion engine and the CVT.

BACKGROUND

Energy conservation and environmental protection are two major themes in the development of motor vehicle technology at present, so continuously variable transmissions (CVT) and hybrid power systems, which have greater fuel efficiency and are more environmentally friendly, have found widespread application, and have developed rapidly in the course of industrialization.

Hybrid power systems generally comprise two drive apparatuses—namely an internal combustion engine (ICE) and an electric motor (E-motor)—and can switch smoothly between these two drive apparatuses. In the prior art, the mode switching is generally realized by an electromagnetic clutch, but this apparatus has a complex structure and a high manufacturing cost. Patent document CN 106143105 A describes a method for realizing drive mode switching in a hybrid power system by means of a synchronizer, such that the internal combustion engine and the electric motor can both operate in a high-efficiency interval.

A CVT gearbox can select the most appropriate transmission ratio rationally according to the internal combustion engine's operating condition, enabling the vehicle to achieve excellent fuel economy at all vehicle speeds; furthermore, a CVT has a simple overall structure and a smaller volume, due to the absence of structures such as complex planetary gears of an automatic gearbox. However, a CVT has low mechanical efficiency, and due to the use of a chain (or a belt, etc.) for transmission, the maximum torque which can be supported is rather low. Thus, in the prior art, a "transfer apparatus" is used to solve this problem; when the internal combustion engine is outputting a large torque (e.g. when the rotation speed is high), the "transfer apparatus" causes the output power of the internal combustion engine to be outputted to the hybrid power system directly without passing through the CVT. The "transfer apparatuses" used at the present time all have very complex structures, and are not suitable for application in hybrid power systems.

SUMMARY

Example aspects broadly comprise a hybrid power system having a CVT, wherein the hybrid power system has a synchronization apparatus provided between an internal combustion engine and an electric motor, and the hybrid power system can be switched between the following states by means of the synchronization apparatus and a clutch provided between the internal combustion engine and the CVT: a state in which an output shaft of the internal combustion engine is connected to an electric motor shaft via the CVT, and a state in which the output shaft of the internal combustion engine is connected to the electric motor shaft but not via the CVT.

According to the present disclosure, the CVT can be simply disabled when necessary by means of the clutch and the synchronization apparatus alone; at the same time, it is only necessary to open/close the synchronization apparatus and the clutch in order to switch between a pure internal combustion engine drive mode, a pure electric motor drive mode, a hybrid power mode, an internal combustion engine start/stop mode, a charging mode and an energy recovery mode. This hybrid power system has a simple structure, reducing manufacturing costs, and increasing system efficiency.

According to an embodiment of the present disclosure, the synchronization apparatus comprises a first synchronizer provided between the internal combustion engine and the CVT, and a second synchronizer provided between the CVT and the electric motor.

According to an embodiment of the present disclosure, the first synchronizer can switch between a closed state in which the output shaft of the internal combustion engine is connected to the electric motor shaft, and an open state in which the output shaft of the internal combustion engine is disconnected from the electric motor shaft; the second synchronizer can switch between a closed state in which an output shaft of the CVT is connected to the electric motor shaft, and an open state in which the output shaft of the CVT is disconnected from the electric motor shaft.

Thus, through cooperative switching of the first synchronizer, the second synchronizer and the clutch, the hybrid power system can be made to run in different drive modes. When necessary, it is possible to disable the CVT and connect the output shaft of the internal combustion engine to the electric motor shaft.

According to another embodiment of the present disclosure, the synchronization apparatus further comprises: a first connection apparatus connected between the first synchronizer and the electric motor shaft to help connect the output shaft of the internal combustion engine to the electric motor shaft, and/or a second connection apparatus connected between the second synchronizer and the electric motor shaft to help connect the output shaft of the CVT to the electric motor shaft. The connection apparatus is, for example, a gear connection apparatus.

According to an embodiment of the present disclosure, when the clutch is in a closed or frictional sliding state, the first synchronizer is in an open state and the second synchronizer is in a closed state, the output shaft of the internal combustion engine is connected to an input shaft of the CVT, and the output shaft of the CVT is connected to the electric motor shaft, so that the hybrid power system is in the state in which the output shaft of the internal combustion engine is connected to the electric motor shaft via the CVT, i.e. the CVT is connected into the system.

In such a connection situation, if the electric motor has not been started, then the system relies only on the internal combustion engine to drive the vehicle via the CVT, so that the vehicle runs in the pure internal combustion engine drive mode. This mode is comparatively suited to a state of the vehicle when it has just been started by the internal combustion engine or is running at low speed; in this connection situation, if the hybrid power system starts the electric motor when being driven by the internal combustion engine, then the hybrid power system will subsequently output a driving force by means of the internal combustion engine and the electric motor via the CVT, thereby operating in the hybrid power mode. In this hybrid power mode, the electric motor can adjust an operating point of the internal combustion engine via the CVT, so that the internal combustion engine operates in a higher-efficiency interval; in this connection situation, if the electric motor starts and outputs a driving force, then the electric motor can be made to start the internal combustion engine by means of this manner of connection, so that the hybrid power system operates in a start/stop mode. In this mode, the state of the clutch may be closed or frictional sliding. Subsequently, the vehicle can enter the hybrid power mode or the pure internal combustion engine drive mode (turning off the electric motor).

According to another embodiment of the present disclosure, when the clutch is in an open state, the first synchronizer is in a closed state and the second synchronizer is in an open state, then the CVT is disabled, and the hybrid power system is in the state in which the output shaft of the internal combustion engine is connected to the electric motor shaft but not via the CVT.

In this connection situation, if the electric motor has not been started, then the hybrid power system outputs a driving force directly by means of the internal combustion engine, not via the CVT, thereby operating in a pure internal combustion engine drive mode. This mode is comparatively suited to situations in which the vehicle is running at high speed and a rotation speed of the internal combustion engine is in a high-efficiency zone. Because the CVT has low mechanical efficiency and cannot support too great a torque, the internal combustion engine drives the vehicle by means of the synchronization apparatus and the clutch, not via the CVT, thereby increasing the system efficiency. In this connection situation, the electric motor is started when the internal combustion engine is running, such that the vehicle runs in the hybrid power mode, and the electric motor is thereby able to adjust the operating point of the internal combustion engine. In this connection situation, when the hybrid power system is stationary, e.g. parked or stopped, it is possible to make the hybrid power system operate in the start/stop mode or the charging mode. In the start/stop mode, the electric motor shaft turns an internal combustion engine shaft directly or via the connection apparatus, thereby starting the internal combustion engine. In the charging mode, the output shaft of the internal combustion engine turns the electric motor shaft directly or via the connection apparatus, thereby charging the electric motor.

According to another embodiment of the present disclosure, when the clutch, the first synchronizer and the second synchronizer are all in an open state, the internal combustion engine and the CVT are both disabled, i.e. are not connected into the hybrid power system.

In this connection situation, the electric motor shaft is connected to a differential using a gear transmission apparatus, e.g. two gear pairs, and the hybrid power system can thereby operate in the pure electric motor drive mode and the energy recovery mode. When motive power is required, the electric motor drives the running of the vehicle via the electric motor shaft; when speed reduction or braking is required, the vehicle wheels drive the rotation of the electric motor shaft via the differential and the gear transmission apparatus, thereby generating electricity such that the electric motor recovers surplus kinetic energy.

BRIEF DESCRIPTION OF THE DRAWINGS

Other features and advantages of the present disclosure can be obtained through an explanation of embodiments according to the accompanying drawings below.

The drawings are as follows.

Identical reference labels are used for identical or functionally identical components of the present disclosure. Additionally, due to the need for clear display, individual drawings only show those reference labels which are needed to describe the drawing in question.

DETAILED DESCRIPTION

Figure 1:
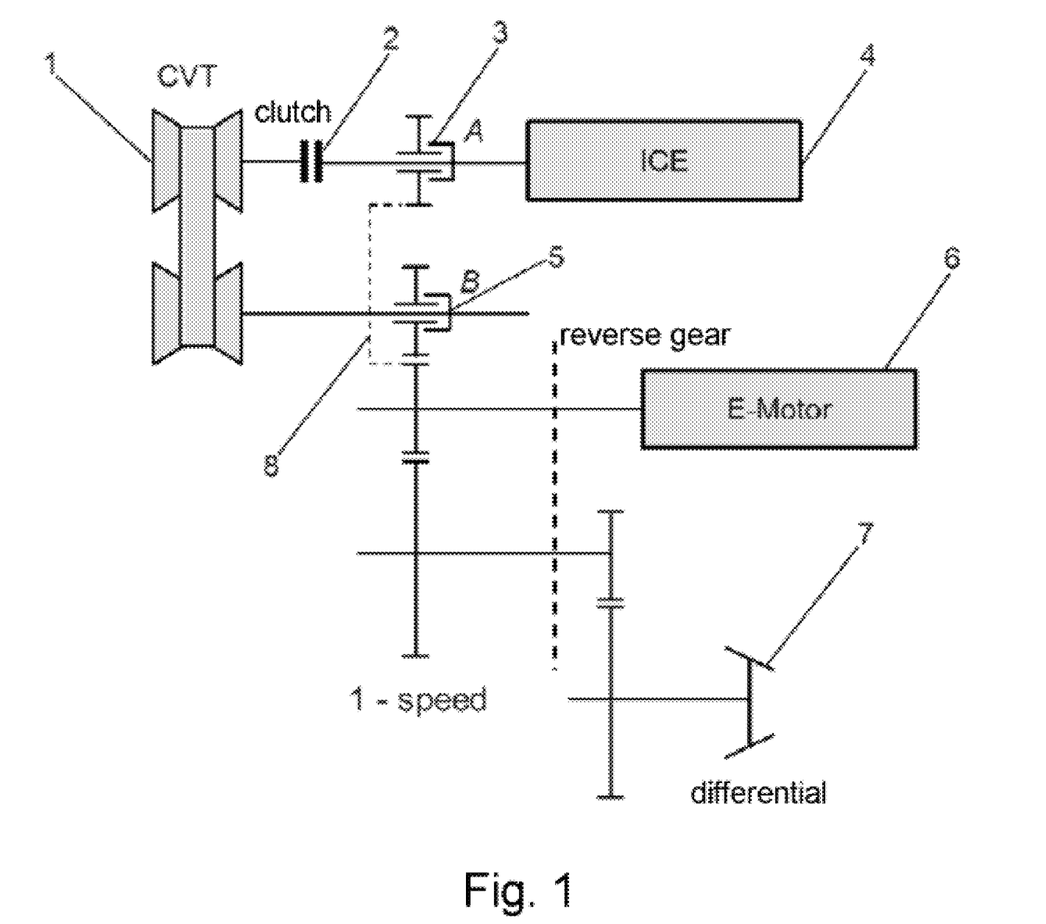
FIG. 1 is a simplified structural diagram of the hybrid power system according to the present disclosure.

As shown in FIG. 1, a hybrid power system according to the present disclosure mainly comprises a CVT 1, a clutch 2, an internal combustion engine 4, an electric motor 6, a differential 7 and a synchronization apparatus 3, 5, wherein the clutch 2 is provided between the internal combustion engine and the CVT, and the synchronization apparatus 3, 5 is provided between the internal combustion engine and the electric motor.

In this embodiment, the synchronization apparatus 3, 5 comprises two synchronizers A and B and a gear connection apparatus 8. The synchronizer A is installed between the clutch 2 and the internal combustion engine, and the synchronizer A can switch between connecting and disconnecting the gear connection apparatus 8 and an electric motor shaft; the other synchronizer B is installed between the CVT and the electric motor 6, and the other synchronizer B can switch between connecting and disconnecting a CVT output shaft and the electric motor shaft.

In this embodiment, the hybrid power system need only open/close the synchronization apparatus and the clutch in order to simply and smoothly switch between a pure internal combustion engine drive mode, a pure electric motor drive mode, a hybrid power mode, an internal combustion engine start/stop mode, a charging mode and an energy recovery mode.

Figure 2:
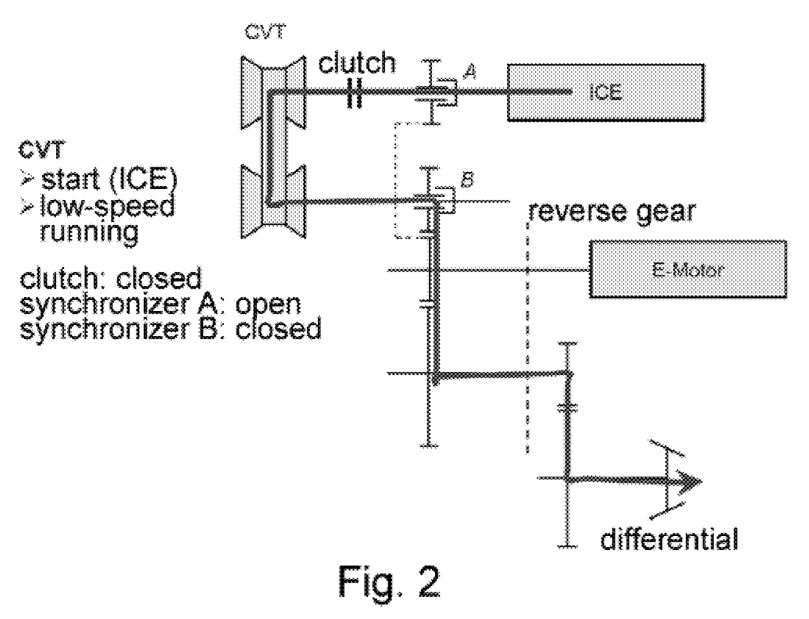
FIG. 2 is an energy flow chart when the hybrid power system is running in the pure internal combustion engine drive mode via the CVT.

FIG. 2 shows an energy flow chart when a vehicle is running in the pure internal combustion engine drive mode via the CVT. At this time, the vehicle has just started or is running at low speed. In such a situation, the clutch 2 is closed, and the synchronizer A is open, therefore an output shaft of the internal combustion engine is connected to an input shaft of the CVT; the synchronizer B is closed, and the output shaft of the CVT is connected to the electric motor shaft. At this time, the electric motor 6 has not been started, and the system relies only on the internal combustion engine to drive the vehicle via the CVT 1.

Figure 3:
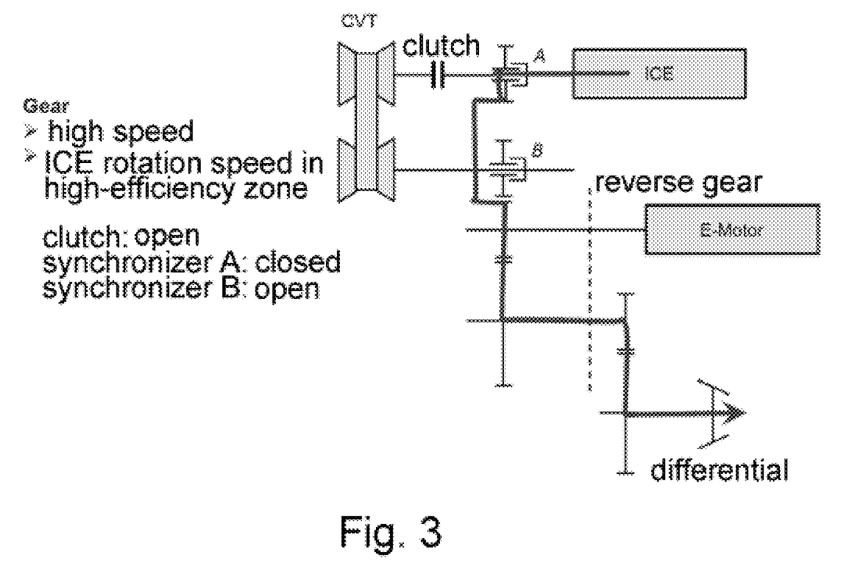
FIG. 3 is an energy flow chart when the hybrid power system is running in the pure internal combustion engine drive mode but not via the CVT.

FIG. 3 shows an energy flow chart when the vehicle is running in the pure internal combustion engine drive mode but not via the CVT; at this time, the vehicle is running at high speed, and a rotation speed of the internal combustion engine is in a high-efficiency zone. In such a situation, the clutch 2 is opened, and the synchronizer A is closed, therefore the output shaft of the internal combustion engine is connected to the gear connection apparatus 8; the synchronizer B is open, the output shaft of the CVT is disconnected from the electric motor shaft, and the gear connection apparatus 8 is connected to the electric motor shaft. At this time, the electric motor 6 has not been started, and the system relies only on the internal combustion engine to drive the vehicle directly, not via the CVT.

Figure 4:
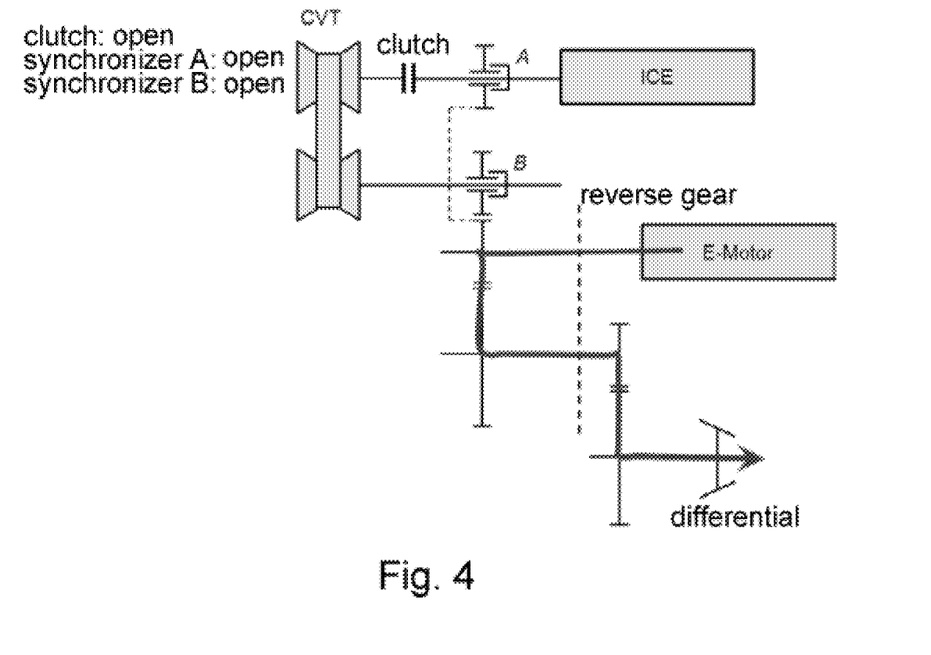
FIG. 4 is an energy flow chart when the hybrid power system is running in the pure electric motor drive mode.

FIG. 4 shows an energy flow chart when the vehicle is running in the pure electric motor drive mode; at this time, the clutch 2, the synchronizer A and the synchronizer B are all opened, and only the electric motor 6 is relied upon to drive the vehicle.

Figure 5:
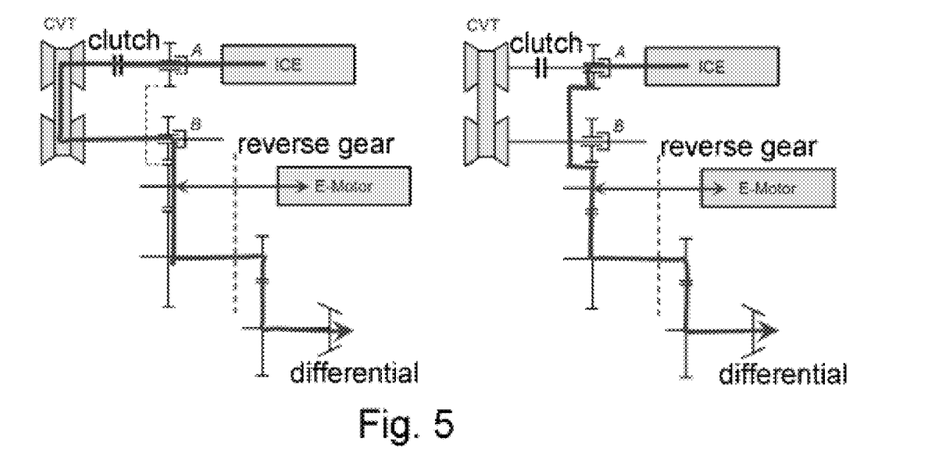
FIG. 5 is an energy flow chart when the hybrid power system is running in the hybrid power mode.

FIG. 5 shows an energy flow chart when the vehicle is running in the hybrid power mode. In the two drawings (the left drawing and the right drawing) shown in FIG. 5, the connection arrangements of the clutch and the synchronizers A and B are the same as those shown in FIGS. 2 and 3 respectively. The difference is that: in both situations shown in FIG. 5, the electric motor has been started. Thus, the system requires the internal combustion engine and the electric motor to operate together in order to drive the vehicle, either via or not via the CVT. Due to the fact that the output shaft of the internal combustion engine is connected to the electric motor shaft via the CVT or not via the CVT, the electric motor can adjust an output torque of the internal combustion engine, i.e. can adjust an operating point of the internal combustion engine, such that the internal combustion engine is in a better efficiency interval.

Figure 6:
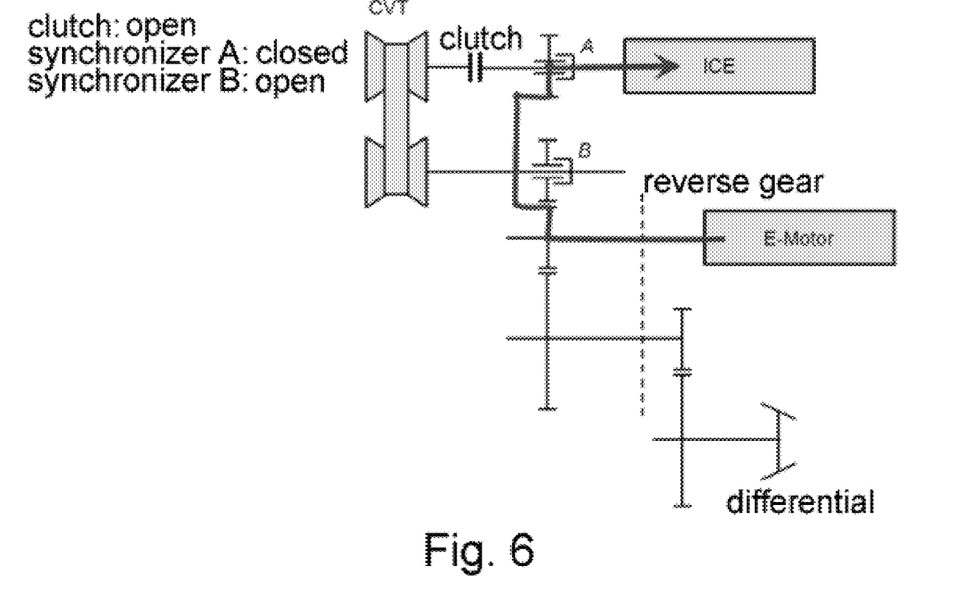
FIG. 6 is an energy flow chart when the hybrid power system is running in the start/stop mode while stationary.

FIG. 6 shows an energy flow chart when the vehicle is running in the start/stop mode while stationary. In such a situation, the vehicle is in a stationary state, the internal combustion engine 4 has not been started, the clutch 2 is opened, the synchronizer A is closed and the other synchronizer B is opened, i.e. the electric motor shaft is connected to an internal combustion engine shaft via the gear connection apparatus 8. The electric motor starts, and then starts the internal combustion engine by connecting and driving the internal combustion engine shaft. Thus, in this mode, the internal combustion engine can be started by means of the electric motor.

Figure 7:
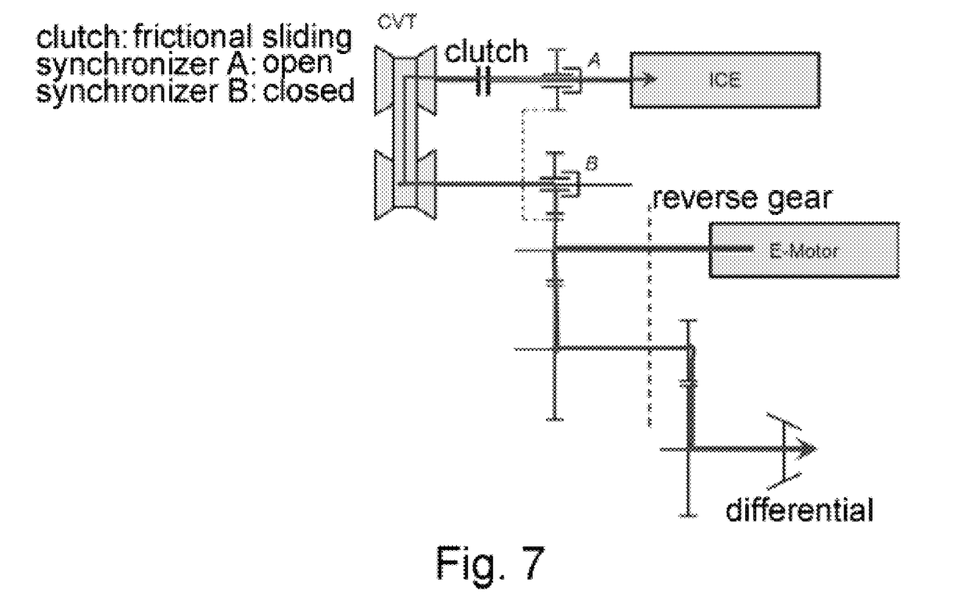
FIG. 7 is an energy flow chart when the hybrid power system is running in the start/stop mode while running.

FIG. 7 shows an energy flow chart of another situation when the vehicle is running in the start/stop mode while running. In such a situation, for example a situation where a motor vehicle is started and, in an initial stage, driven by the electric motor, the vehicle is in a running state, and the internal combustion engine 4 has not operated; at this time, the clutch is put into a frictional sliding or closed state, the synchronizer A is open and the other synchronizer B is closed, i.e. the electric motor shaft is connected to the internal combustion engine shaft via the CVT and the clutch, and the electric motor shaft is at this time also connected to the differential via a gear pair. Thus, the electric motor starts the internal combustion engine, and the vehicle can then enter the hybrid power mode or the pure internal combustion engine drive mode (turning the electric motor on/off).

Figure 8:
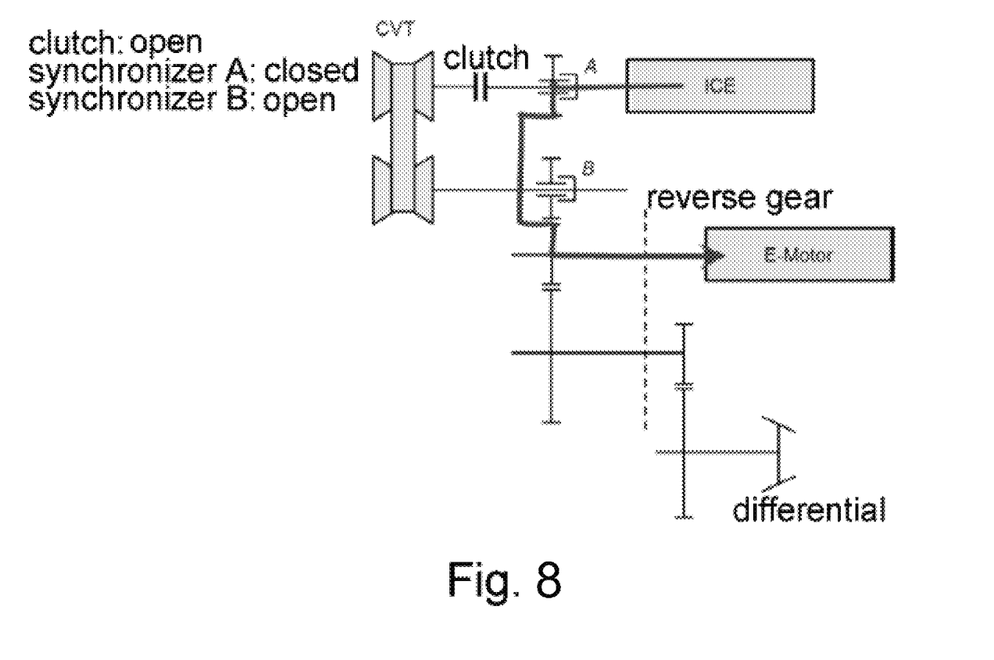
FIG. 8 is an energy flow chart when the hybrid power system is operating the charging mode.

FIG. 8 shows an energy flow chart when the vehicle is operating in the charging mode. In such a situation, the vehicle is in a stationary state, the clutch is opened, the synchronizer A is closed and the other synchronizer B is opened, i.e. the output shaft of the internal combustion engine is connected to the electric motor shaft via the gear connection apparatus. Thus, the internal combustion engine shaft turns the electric motor shaft, so that the electric motor is charged.

Figure 9:
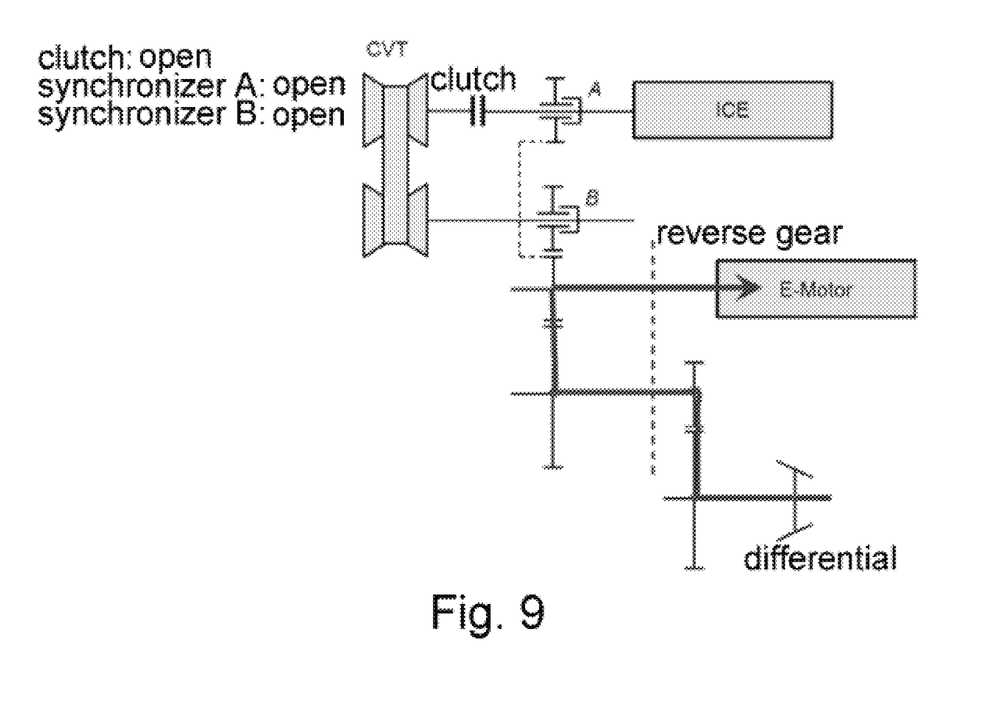
FIG. 9 is an energy flow chart when the hybrid power system is running in the energy recovery mode.

FIG. 9 shows an energy flow chart when the vehicle is running in the energy recovery mode. In such a situation, the vehicle is in a speed-reduction or braking state; the clutch 2, the synchronizer A and the other synchronizer B are all opened, such that the differential is connected to the electric motor shaft via the gear pair. The vehicle wheels drive the electric motor shaft via the differential, thereby converting surplus kinetic energy of the vehicle into electrical energy, for storage in an electric machine.

Figure 10:
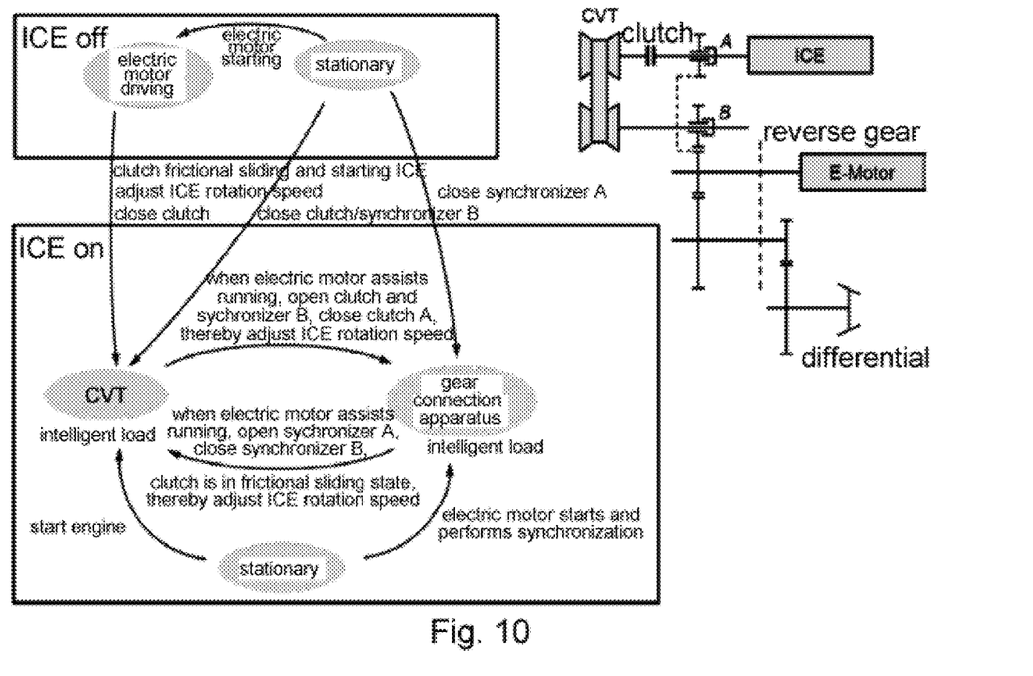
FIG. 10 is a schematic diagram of switching between various states of the hybrid power system according to the present disclosure.

FIG. 10 shows a schematic diagram of switching among various states of the hybrid system according to the present disclosure. With the internal combustion engine (ICE) turned off, the vehicle can be started by the electric motor from a stationary state, and at a low speed is driven by the electric motor alone (at this time, the clutch and the synchronizers are all opened); subsequently, the clutch is closed or put into a frictional sliding state, the synchronizer A is opened and the synchronizer B is closed, and the electric motor can start the internal combustion engine via the CVT. Thus, the vehicle enters the hybrid power mode. In this mode, the electric motor can adjust the operating point of the internal combustion engine via the CVT, such that the internal combustion engine is in a higher-efficiency interval. When the vehicle enters a high-speed state or the rotation speed enters the high-efficiency zone, the CVT is disabled by opening the clutch, closing the synchronizer A and opening the synchronizer B, so that the internal combustion engine is connected to the electric motor shaft via the connection apparatus, and the vehicle runs by means of the internal combustion engine and the electric motor, not via the CVT. In this mode, the electric motor can still adjust the operating point of the internal combustion engine via the connection apparatus. If the electric motor is turned off at this time, then the vehicle will run in the pure internal combustion engine drive mode. When the vehicle needs to reduce its speed or brake, the clutch and the synchronizers are all opened; the vehicle wheels can turn the electric motor shaft via the differential and the gear pair, thereby causing the electric motor to generate electricity, converting surplus kinetic energy into electrical energy, and realizing the energy recovery mode.

Although possible embodiments have been described demonstratively in the description above, it should be understood that variations still exist through all combinations of embodiments and technical features which are already known and additionally those which would readily occur to those skilled in the art. In addition, it should also be understood that a demonstrative embodiment merely serves as an example, and such an embodiment does not restrict the scope of protection, application and construction of the present disclosure in any way. Through the description above, it is more the case that a form of technical guidance for converting at least one demonstrative embodiment is provided to those skilled in the art, wherein as long as the scope of protection of the claims is not departed from, it is possible to make various changes, especially changes relating to the function and structure of the components. For example, in the embodiments above, the synchronization apparatus includes the two synchronizers and the connection apparatus is connected to the synchronizer A, but this is merely an example; those skilled in the art will realize that all synchronization apparatuses may be considered as long as they are capable of realizing the function of connecting and disabling the CVT. For example, the synchronizer B connects the CVT output shaft to the electric motor shaft via the connection apparatus, or the synchronizer A connects the output shaft of the internal combustion engine to the electric motor shaft via a first connection apparatus and the synchronizer B connects the CVT output shaft to the electric motor shaft via a second connection apparatus; all are also included in the scope of the present disclosure.

In the description of the present disclosure, it must be understood that orientations or positional relationships indicated by the terms "upper", "lower", "front", "rear", "left", "right", "horizontal", "inner" and "outer" etc. are based on the orientations or positional relationships shown in the drawings, and are merely intended to facilitate the description of the present disclosure and simplify description; they do not indicate or imply that the apparatus or element referred to must have a specific orientation or be constructed and operated in a specific orientation, and therefore must not be interpreted as limiting the present disclosure. In addition, the terms "first", "second" etc. are merely used for descriptive purposes and must not be interpreted as indicating or implying relative importance or implicitly showing the quantity of the indicated technical feature. In the description of the present disclosure, the meaning of "multiple" is two or more, unless otherwise defined clearly and specifically.

REFERENCE LABELS

1 CVT (continuously variable transmission)
2 clutch
3 synchronization apparatus
4 internal combustion engine
5 synchronization apparatus
6 electric motor
7 differential
8 gear connection apparatus
A synchronizer
B synchronizer

The invention claimed is:

1. A hybrid power system comprising:
a CVT comprising a CVT input shaft and a CVT output shaft;
an internal combustion engine comprising an internal combustion engine output shaft;
an electric motor comprising an electric motor shaft;
a clutch provided between the internal combustion engine and the CVT; and
a synchronization apparatus provided between the internal combustion engine and the electric motor, wherein:
the clutch and the synchronization apparatus can be adjusted to connect the internal combustion engine output shaft to the electric motor shaft via the CVT and connect the internal combustion engine output shaft to the electric motor shaft without the CVT;
the synchronization apparatus comprises a first synchronizer provided between the internal combustion engine and the CVT and a second synchronizer provided between the CVT and the electric motor; and
the first synchronizer is switchable between a first synchronizer closed state in which the internal combustion engine output shaft is connected to the electric motor shaft, and a first synchronizer open state in which the internal combustion engine output shaft is disconnected from the electric motor shaft; or
the second synchronizer is switchable between a second synchronizer closed state in which the CVT output shaft is connected to the electric motor shaft, and a second synchronizer open state in which the CVT output shaft is disconnected from the electric motor shaft.

2. The hybrid power system of claim 1, wherein, when:
the clutch is put into a clutch open state;
the first synchronizer is in the first synchronizer open state; and
the second synchronizer is in the second synchronizer open state, then the internal combustion engine and the CVT are both disabled, so that the hybrid power system can operate in a pure electric motor drive mode or an energy recovery mode.

3. The hybrid power system of claim 1, further comprising:
a first connection apparatus connected between the first synchronizer and the electric motor shaft for connecting the internal combustion engine output shaft to the electric motor shaft; or
a second connection apparatus connected between the second synchronizer and the electric motor shaft for connecting the CVT output shaft to the electric motor shaft.

4. The hybrid power system of claim 1, further comprising a differential connected to the electric motor shaft by a gear set.

5. A hybrid power system comprising:
a CVT comprising a CVT input shaft and a CVT output shaft;
an internal combustion engine comprising an internal combustion engine output shaft;
an electric motor comprising an electric motor shaft;
a clutch provided between the internal combustion engine and the CVT; and
a synchronization apparatus provided between the internal combustion engine and the electric motor, wherein:
the clutch and the synchronization apparatus can be adjusted to connect the internal combustion engine output shaft to the electric motor shaft via the CVT and connect the internal combustion engine output shaft to the electric motor shaft without the CVT;
the synchronization apparatus comprises a first synchronizer provided between the internal combustion engine and the CVT and a second synchronizer provided between the CVT and the electric motor; and when:
the clutch is closed or put into a frictional sliding state, the first synchronizer is in a first synchronizer open state, and the second synchronizer is in a second synchronizer closed state, then:
the internal combustion engine output shaft is connected to the CVT input shaft;
the CVT output shaft is connected to the electric motor shaft; and
the internal combustion engine output shaft is connected to the electric motor shaft via the CVT.

6. The hybrid power system of claim 5, wherein, if the electric motor has not been started, then the hybrid power system outputs a driving force from the internal combustion engine via the CVT, thereby operating in a pure internal combustion engine drive mode.

7. The hybrid power system of claim 5, wherein, if the electric motor is started when the internal combustion engine is operating, then the hybrid power system outputs a driving force from the internal combustion engine and the electric motor via the CVT, thereby operating in a hybrid power mode.

8. The hybrid power system of claim 7, wherein the electric motor can adjust an operating point of the internal combustion engine in the hybrid power mode.

9. The hybrid power system as claimed in claim 5, wherein, if the electric motor starts and outputs a driving force, then the electric motor can be made to start the internal combustion engine, so as to operate in a start/stop mode.

10. A hybrid power system comprising:
- a CVT comprising a CVT input shaft and a CVT output shaft;
- an internal combustion engine comprising an internal combustion engine output shaft;
- an electric motor comprising an electric motor shaft;
- a clutch provided between the internal combustion engine and the CVT; and
- a synchronization apparatus provided between the internal combustion engine and the electric motor, wherein:
  the clutch and the synchronization apparatus can be adjusted to connect the internal combustion engine output shaft to the electric motor shaft via the CVT, and connect the internal combustion engine output shaft to the electric motor shaft without the CVT;
  the synchronization apparatus comprises a first synchronizer provided between the internal combustion engine and the CVT, and a second synchronizer provided between the CVT and the electric motor; and when:
  the clutch is opened, the first synchronizer is in a first synchronizer closed state, and the second synchronizer is in a second synchronizer open state, then:
  the internal combustion engine output shaft is connected to the electric motor shaft without the CVT.

11. The hybrid power system of claim 10, wherein, if the electric motor has not been started, the hybrid power system outputs a driving force from the internal combustion engine without the CVT, thereby operating in a pure internal combustion engine drive mode.

12. The hybrid power system of claim 10, wherein, if the electric motor is started when the internal combustion engine is operating, the hybrid power system outputs a driving force from the internal combustion engine and the electric motor via the CVT, thereby operating in a hybrid power mode.

13. The hybrid power system of claim 10, wherein, when the hybrid power system is stationary:
- if the electric motor shaft turns the internal combustion engine output shaft, then the hybrid power system operates in a start/stop mode; or
- if the internal combustion engine output shaft turns the electric motor shaft, then the hybrid power system runs in a charging mode.

* * * * *